Feb. 10, 1925.
G. D. MOGULIANO
1,526,076
INTERNAL COMBUSTION ENGINE
Filed Jan. 7, 1922 4 Sheets-Sheet 4
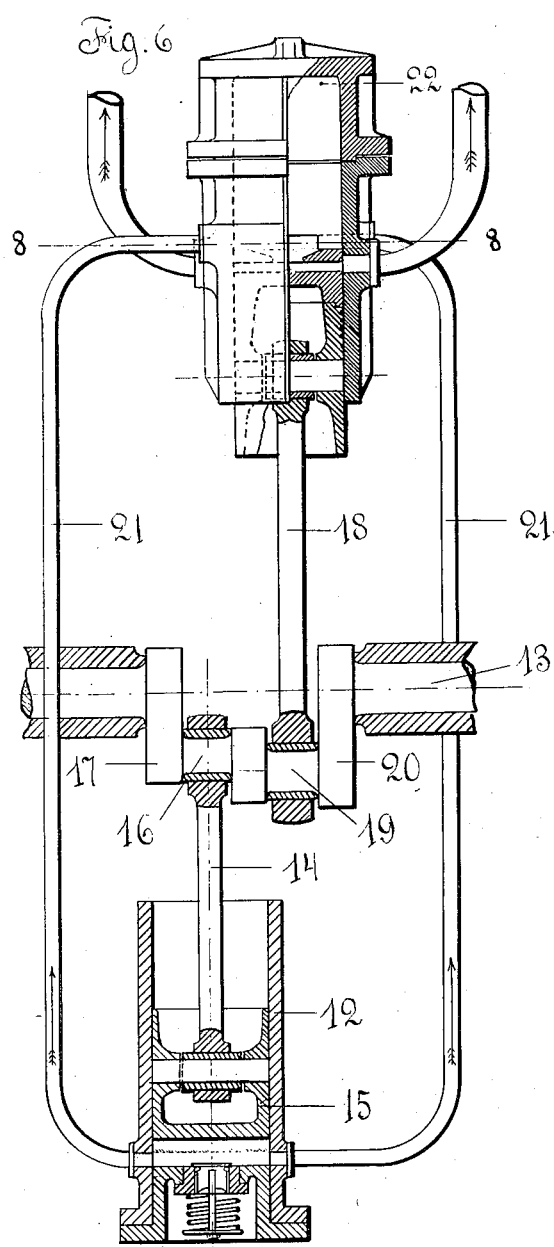
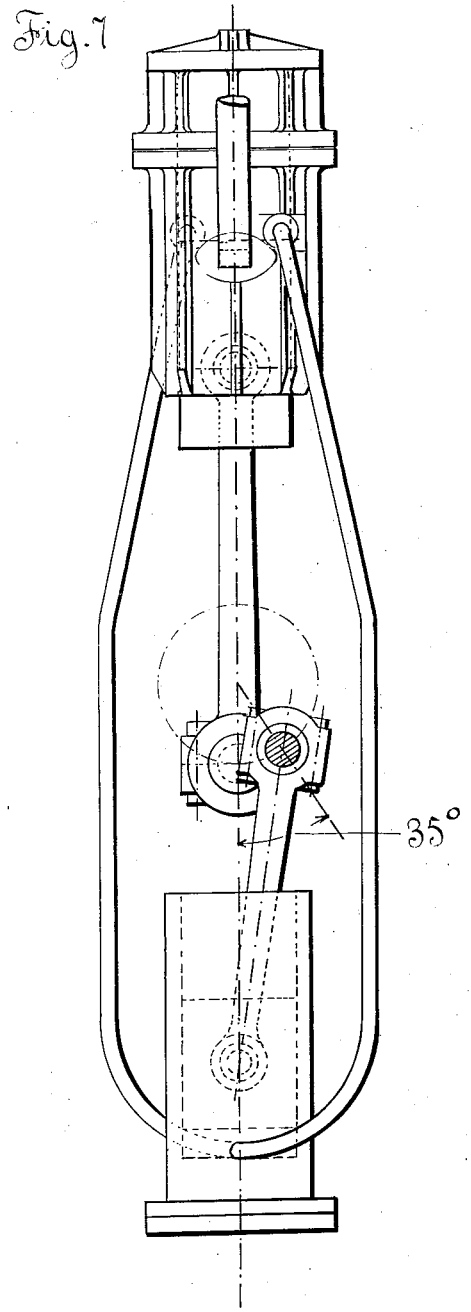
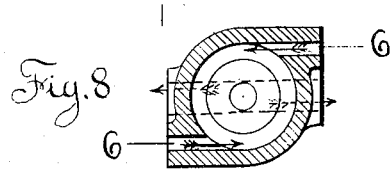

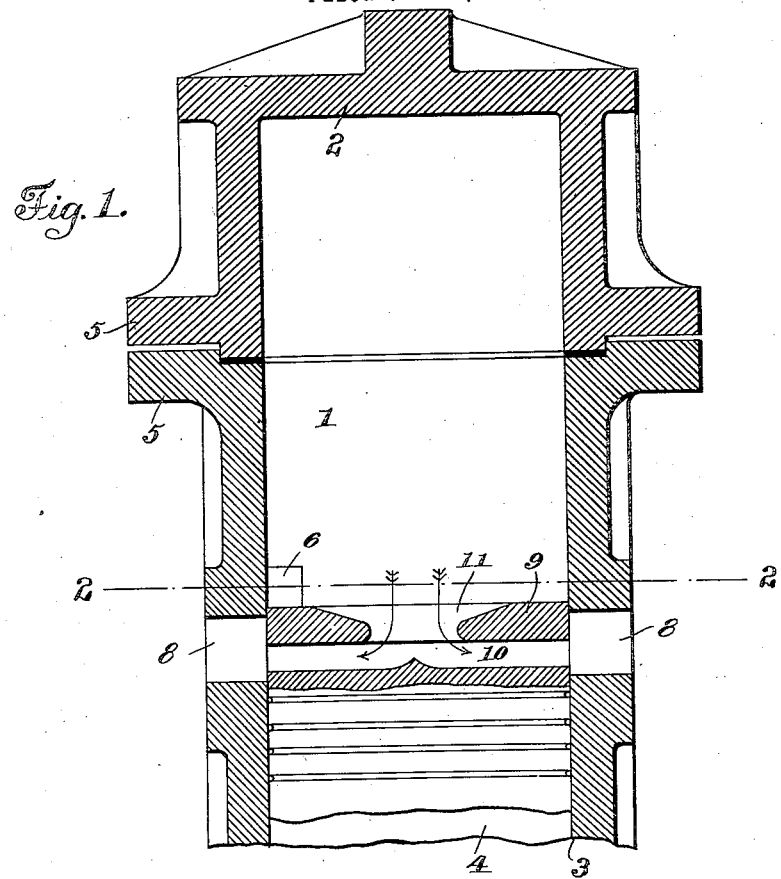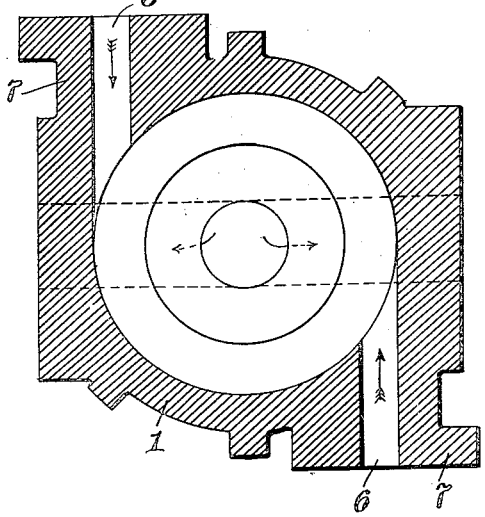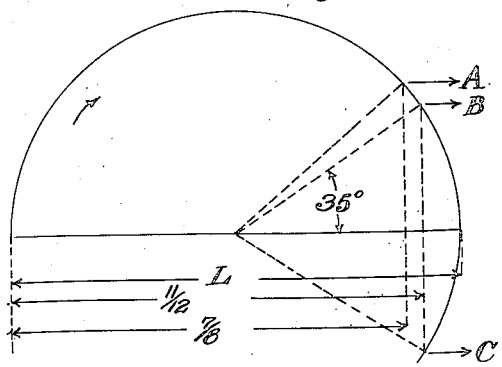

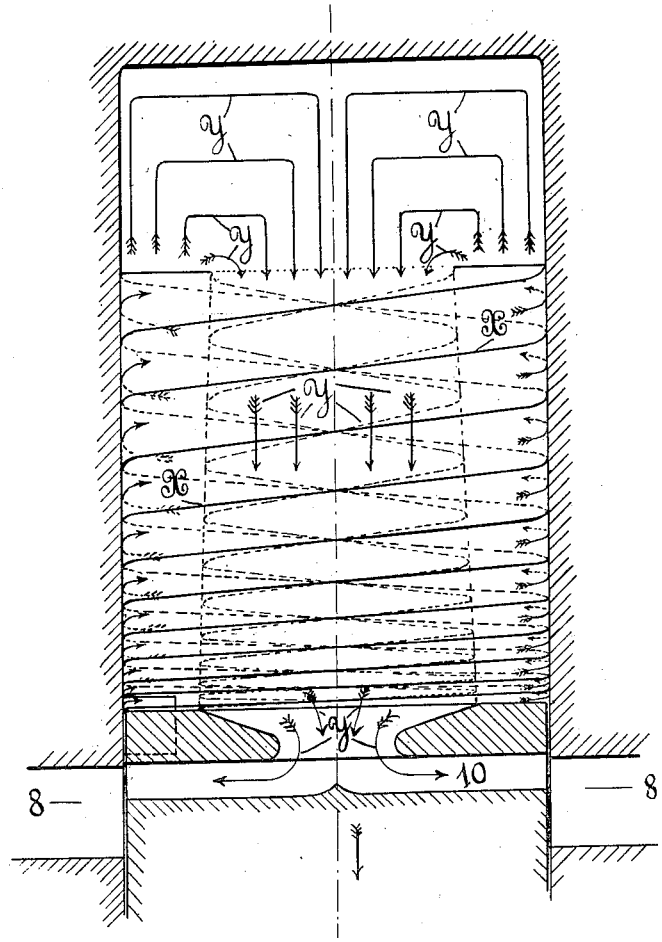

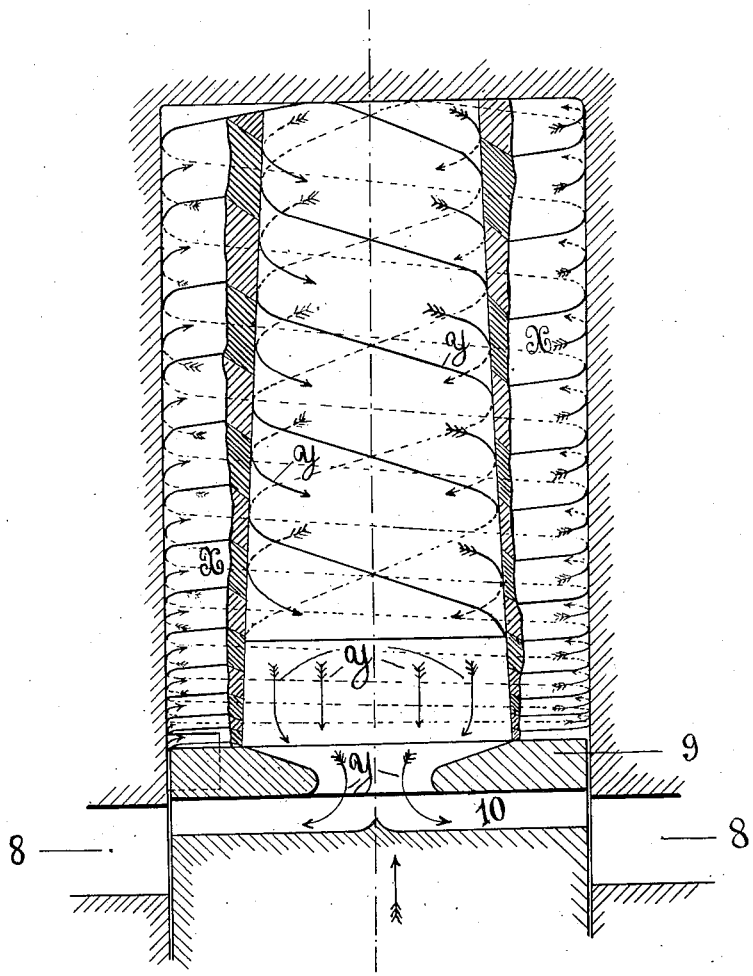

Patented Feb. 10, 1925.

1,526,076

UNITED STATES PATENT OFFICE.

GREGORY DMITRIEFF MOGULIANO, OF NEW YORK, N. Y.

INTERNAL-COMBUSTION ENGINE.

Application filed January 7, 1922. Serial No. 527,685.

*To all whom it may concern:*

Be it known that I, GREGORY DMITRIEFF MOGULIANO, a citizen of Russia, residing at the Woodstock Hotel, 127 West 43rd Street, in the borough of Manhattan, city, county, and State of New York, have invented certain new and useful Improvements in Internal-Combustion Engines, of which the following is the specification.

This invention relates to internal combustion engines, and my improvements are particularly directed to engines of the two-stroke cycle type, with which each alternate piston stroke is a power stroke.

The objects attained by my improvements are:

(1) The absorption of a large amount of heat from the cylinder wall by incoming charges of fresh air, both cooling the cylinder and conserving the absorbed heat; thereby achieving for the air a high degree of combustion supporting efficiency.

(2) To induce the helical travel of an incoming fresh air charge against the surface of the cylinder wall, and toward the cylinder head, while the burnt gases of a previous charge are exhausting, thus confining the residual burnt gases to the central portion of the cylinder; and to cause a whirling charge of air to the deflected back from the cylinder head, and applied, axially of the cylinder, as a scavenging force with respect to the burnt gases, prior to the closing of the exhaust means.

(3) To set up a whirling condition of an air charge in a cylinder while undergoing compression at fuel igniting temperature, and to introduce fuel into the compressed charge for expansion in the production of the power stroke.

In the carrying out of these objects I employ a working cylinder and an air compressor. Air compressed to a suitable degree in the compressor is delivered to the working cylinder through intake means located therein in a transverse plane where the supply is adapted to be controlled by the piston when near the limit of its power stroke. The intake means may have the form of ports whose axes are tangential to the inner perimeter of the cylinder, so that air introduced through these ports, under pressure, will be guided in a circular path, closely hugging the wall by reason of the combined effects of the initial direction of the jet from the port, and the radial resistance it encounters, and becoming helical through upward displacement due to the normal tendency of the incoming air to rise as it becomes heated and expands by contact with the hot cylinder wall.

The piston of the working cylinder has a transverse passage, opening to the expansion chamber through a central aperture, the passage communicating with oppositely disposed exhaust ports in the cylinder, located in a transverse plane near the limit of the piston power stroke.

The relative arrangement of the cylinder intake and exhaust outlets is such that the exhaust ports are opened ahead of the opening of the intake ports during the latter part of the power stroke, and are held open while the piston begins its return stroke, the intake ports closing before the exhaust ports have been closed to permit a descending column of air to expel the residual burnt gases.

The clearance in the cylinder which comprises the combustion chamber is of relatively small area to permit of high initial compression which results in the production of an exceedingly powerful explosion by auto-ignition upon the introduction of a relatively small quantity of fuel. Normally the intense cylinder temperature thereby induced would with present known cooling means involve excessive heat radiation losses, but by my improved means of sweeping the cylinder wall with a helical flow of air in the form of a new charge, a large proportion of the cylinder heat is absorbed thereby and turned to useful effect by rendering the new charge more readily combustible.

Other features and advantages of my invention will hereinafter appear.

In the drawings:

Figure 1 is a vertical sectional view of a cylinder embodying my inventive features.

Figure 2 is a section on the line 2—2 of Fig. 1.

Fig. 3 is a diagram illustrating the process of exhausting the burnt gases, and the replacement of fresh air for a succeeding explosion.

Fig. 4 is a diagrammatic view illustrating the course in the cylinder taken by incoming air during the early portion of the intake opening.

Fig. 5 is a similar view illustrating the course in the cylinder taken by the charge of air toward the closing of the intake opening.

Fig. 6 is a side elevation, partly in section, showing by way of example several operative elements constituting an assembly whereby my invention may be carried into effect.

Fig. 7 is a front view of Fig. 6, and

Fig. 8 is a section on the line 8—8 of Fig. 6.

In the drawings, let 1 indicate a cylinder, having a closed end 2, herein designated the cylinder head, and 3 an open end for the operation of a piston 4.

The cylinder is here shown as composed of upper and lower parts, each provided with flanges 5, which may have any suitable uniting means.

The cylinder is provided with intake ports or passages 6, 6, shown for example in Fig. 2 as formed in extensions 7, 7, that are capable of connection with a source of pressure air supply.

The passages 6, 6 are arranged at angles whereby their axes are respectively tangential to the inner perimeter of the cylinder, so that air introduced through these passages, under pressure, into the cylinder, will be guided into a circular path by the contour of the cylinder wall, against which it flows.

The piston is arranged to begin to uncover the ports 6, 6 when near the limit of its expansion or power stroke, and to entirely uncover said ports when it has completed that stroke. Consequently the piston again covers the ports 6, 6 during the first portion of its return stroke.

The cylinder is also provided with oppositely arranged exhaust ports 8, 8, here shown as located in a transverse plane below the plane of the intake ports; and the head 9 of the piston is shown as provided with a transverse passage 10, which is adapted to have communication with the exhaust ports 8, 8 as the piston is approaching the limit of its expansion stroke, the communication remaining open while the piston reaches the limit of its expansion stroke and until it recedes through the early portion of its return stroke for compression.

The passage 10 in the piston head is in communication with the cylinder through an aperture 11, which is shown as presenting a flared entrance for reception of the products of combustion.

While the design, proportions, and relative arrangements of the intake and exhaust ports are subject to variation according to the character of the engine and the nature of the liquid fuel employed, I have in the present drawings arbitrarily shown the exhaust ports as adapted to begin to function when the piston has completed ⅞ of its expansion stroke, and I have shown the intake ports as adapted to begin to function when the piston has completed 11/12 of its expansion stroke.

These performances are represented in the diagram of Fig. 3, wherein the line designated L indicates the full extent of the expansion stroke; A the initial opening of the exhaust; B the initial opening of the intake, and C the closing of the intake.

In the lay out views of Figs. 6 and 7 the example of a compressor there shown is represented as a cylinder 12, located beneath the crank shaft 13, and having the connecting rod 14 of its plunger 15 journalled on the crank pin 16 of a crank 17; whereas the piston 4 of the power cylinder is operated by a connecting rod 18, journalled on a crank pin 19 of a crank 20.

An arc of 35° separates the cranks 17 and 20 in their relative angular setting for the exemplified arrangement of the ports 6, 6 and 8, 8 in conjunction with the operation of piston 4, so that the plunger 15, operating in cylinder 12, will have completed its compression stroke when the piston 4, having reached the end of its expansion stroke and opened the exhaust outlet, is about to begin to open the intake ports 6, 6, whereby, upon the opening of these ports, air is delivered by pipes 21 therethrough at maximum compression, which may, for example, have a pressure of from two to two and one half atmospheres. At such or other suitable degree of pressure the new air charge, entering cylinder 2 at a tangent to the inner perimeter of the cylinder, will sweep contactingly around the cylinder wall, its stream rising, through heat absorption, in manner to resemble a helix, as represented in Fig. 4 by the upwardly directed arrow-headed lines $x$, and forming a whirling, hollow column of heated air which concentrically surrounds the expanded, residual gases of combustion. For it will be appreciated that, since the exhaust outlet had opened ahead of the opening of the intake, the cylinder had thereby been initially relieved of the expanded gases of combustion, and the particular functions of the succeeding, fresh air compression charge are to effect the complete scavenging of the cylinder, and to cool the cylinder, while conserving the thus absorbed heat.

Also in Fig. 4 will be seen arrow-headed lines $y$ which indicate the continuing course of the heated, helical, pressure streams of air, that strike against the cylinder head and rebound therefrom downwardly through the hollow space within the whirling air column, thereby constituting a follower for the residual gases of combustion and forcing the latter out through the piston aperture 11, passage 10 and exhaust ports 8, 8.

In Fig. 5, where the piston 4 is shown beginning its return stroke, the helical streams of air received from the opposite ports 6, 6 are indicated in the hollow formation referred to by shading, at opposite angles, as representative of a forward portion, broken away, of this formation.

The pressure at which the fresh air charge is introduced to the cylinder is sufficient to completely clear out all the expanded gases of combustion, and to leave in the cylinder at the time of intake closing a charge of fresh air.

It should be particularly noted that compression begins just after the intake ports 6, 6 are closed, the exhaust ports 8, 8 remaining open for a fractional period thereafter in the early portion of the return stroke, which has the effect of absolutely enforcing the expulsion of any remaining burnt gases.

The piston 4 therefore performs its compression stroke with respect to a full cylinder of fresh, heated air, that, when compressed to the desired degree, according to the design of the engine and the extent of the combustion space, is to have injected therein a suitable quantity of liquid fuel.

Due to the whirling condition of the entered fresh air charge it will when compressed still be in a state of agitation, and consequently, liquid fuel injected into the compressed charge and exploded therein enters on account of the high temperature present into such complete admixture therewith as to induce an unusually high state of combustion.

The means by which liquid fuel is introduced into the compressed charge of air may be according to known practice where auto ignition is to ensue, and I have shown a jet orifice 22, in Fig. 6, arranged at an angle through the cylinder head for the injection of liquid fuel in substantially the direction of movement of the whirling charge of air, to facilitate the distribution of the fuel therein.

Obviously the fuel injection may be effected in any manner known in the art and therefore not herein shown and described.

In starting up from cold an engine constructed according to my invention, the temperature of the air charge, as compressed in the working cylinder, is relied upon to ignite the injected fuel.

The engine may be cranked against the relatively high compression employed as by the aid of suitable power multiplying gears.

Variations within the spirit and scope of my invention are equally comprehended by the foregoing disclosure.

I claim:

1. The method of scavenging a cylinder of an internal combustion engine having a combustion space wherein the ratio of the volume of piston displacement to the volume of the combustion space exceeds the critical ratio of compression, which consists in relieving expansion pressure, then introducing air under pressure in a direction tangential to the inner perimeter of the cylinder, in a transverse plane, while the piston is near the limit of its power stroke, thereby permitting the air to flow, unopposed, in a hollow columnar form contactingly around the cylinder, and in compressing the retained air charge before adding fuel thereto.

2. The method of effecting heat exchange between the cylinder of an internal combustion engine having a combustion space wherein the ratio of the volume of piston displacement to the volume of the combustion space exceeds the critical ratio of compression, and incoming air, which consists in relieving expansion pressure, then introducing a stream of air under pressure thereto, and imparting unopposed circulatory movement to the air, causing it to contactingly traverse the inner perimeter of the cylinder in the form of a whirling hollow column, and in compressing the retained air charge before adding fuel thereto.

3. The method of scavenging a cylinder of an internal combustion engine which consists in relieving expansion pressure axially through the piston and at the same time introducing an air charge into the cylinder under pressure while the piston is near the limit of its power stroke, causing the air charge to whirl in an unopposed stream contactingly around the inner perimeter of the cylinder in the form of a hollow column, and in continuing the cylinder relief while the air charge returns interiorly of the forwardly moving hollow column to follow the residual gases and force them out.

4. The method of creating a power stroke in a cylinder of an internal combustion engine having a combustion space wherein the ratio of the volume of piston displacement to the volume of the combustion space exceeds the critical ratio of compression, which consists in relieving expansion pressure, then introducing into the cylinder a stream of air under pressure, causing it to flow, unopposed, in the form of a hollow column, contactingly around the inner perimeter of the cylinder, compressing the air charge, and finally injecting thereinto a quota of fuel.

5. The method of creating a power stroke in a cylinder of an internal combustion engine having a combustion space wherein the ratio of the volume of piston displacement to the volume of the combustion space exceeds the critical ratio of compression, which consists in relieving expansion pressure, then introducing into the cylinder a stream of air under pressure, causing it to flow, unopposed, in the form of a hollow column, contactingly around the inner perimeter of the cylinder, compressing the air charge, and finally injecting thereinto a quota of fuel in the direction of its whirling motion.

6. An internal combustion engine having a cylinder and a piston wherein the ratio of the volume of piston displacement to the volume of the combustion space exceeds the critical ratio of compression, the cylinder provided with intake means arranged tangentially to the cylinder bore to cause an incoming charge of air to flow in an unopposed stream and form a hollow column in contact with the inner perimeter of the cylinder, and means for adding a quota of fuel to the air charge when compressed.

7. An internal combustion engine having a power cylinder with a piston, and a compressor, the cylinder characterized by the ratio of the volume of piston displacement to the volume of the combustion space exceeding the critical ratio of compression, the cylinder provided with intake means arranged tangentially to its bore, to cause a charge of air delivered by the compressor to flow sweepingly with circular motion, unopposed, against the inner perimeter of the cylinder in the form of a hollow column, and means for adding a quota of fuel to the air charge when compressed.

8. An internal combustion engine having a power cylinder, with a piston, and a compressor, the cylinder characterized by the ratio of the volume of piston displacement to the volume of the combustion space exceeding the critical ratio of compression, the cylinder provided with intake means and exhaust means, whereof the exhaust means is arranged to open before the opening of the intake means and close after the closing of the intake means, and the intake means is arranged tangentially to the cylinder bore to cause an incoming charge of air to flow, unopposed, in hollow columnar form, contactingly around the inner perimeter of the cylinder, and means for adding a quota of fuel to the air charge when compressed.

9. In an internal combustion engine having a power cylinder, characterized by the ratio of the volume of piston displacement to the volume of the combustion space exceeding the critical ratio of compression, intake means arranged tangentially to the cylinder bore for introducing a charge of air, under compression, into the cylinder, and causing it to flow, unopposed, in the form of a hollow column, contactingly around the inner perimeter of the cylinder, means for compressing the charge, while it is whirling, and means for injecting fuel into the whirling charge in the direction of its rotation, when compressed.

10. An internal combustion engine having a power cylinder, characterized by the ratio of the volume of piston displacement to the volume of the combustion space exceeding the critical ratio of compression, the cylinder provided with a number of intake ports whose axes are disposed tangentially to the inner perimeter of the cylinder, the intake ports being arranged to direct streams of air issuing therefrom contactingly around the cylinder in hollow columnar form, means for compressing an air charge, and means for adding fuel thereto when compressed.

11. An internal combustion engine having a cylinder with intake and exhaust means, the intake means arranged to cause air entered therethrough to flow unopposed in hollow columnar formation, contactingly around the inner perimeter of the cylinder, and a piston operable in the cylinder provided with a central opening and a transverse communicating passage to co-act with the exhaust means by aid of the returning deflected air column.

12. An internal combustion engine including a power cylinder having a piston, and air compressing means, the power cylinder provided with a pair of opposed air intake ports, each penetrating the cylinder wall in a line tangential to the cylinder bore and located in the same transverse plane, near the limit of the piston power stroke, the cylinder also having exhaust ports; the piston provided with a central opening extended inwardly from its face and having a transverse passage for expelling the exhaust gases therethrough by means of the returning air column in communication with said opening adapted to co-act with the exhaust ports, the piston arranged to open the intake ports before opening the exhaust ports and to close the intake parts before closing the exhaust ports, and the cylinder also provided with fuel receiving means through its wall in communication with its interior in the region of compression.

Signed at New York, in the county and State of New York, this 5th day of January, 1922.

GREGORY DMITRIEFF MOGULIANO.